United States Patent
Johnson et al.

(10) Patent No.: US 6,725,160 B1
(45) Date of Patent: Apr. 20, 2004

(54) CORRELATED WEATHER AND PERFORMANCE MEASUREMENT SYSTEM FOR EXTREMELY HIGH FREQUENCY WIRELESS AND FREE SPACE OPTICAL COMMUNICATION SYSTEMS

(75) Inventors: Harold W. Johnson, Roach, MO (US); Timothy D. Euler, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 10/233,710

(22) Filed: Sep. 3, 2002

(51) Int. Cl.[7] ............................................. G06F 169/00
(52) U.S. Cl. ......................................................... 702/3
(58) Field of Search ............................. 702/2, 3, 5; 342/26

(56) References Cited

U.S. PATENT DOCUMENTS

| | | | | |
|---|---|---|---|---|
| 4,980,924 A | * | 12/1990 | Reed et al. | 455/63.1 |
| 5,884,226 A | * | 3/1999 | Anderson et al. | 702/3 |
| 5,984,239 A | * | 11/1999 | Chen | 244/173 |
| 6,058,260 A | * | 5/2000 | Brockel et al. | 703/4 |

* cited by examiner

Primary Examiner—Donald E. McElheny, Jr.

(57) ABSTRACT

A correlated weather and communication performance measurement system includes a processing system and a communication interface. The communication interface receives performance data and weather data. The performance data indicates communication performance for a plurality of communication systems. The weather data indicates weather conditions for a geographic area including the communication systems. The processing system processes the performance data and the weather data to generate correlated data that correlates in time the communication performance and the weather conditions for each of the communication systems. The communication systems comprise at least one of extremely high-frequency wireless systems and free space optical systems.

15 Claims, 2 Drawing Sheets

CORRELATED WEATHER AND PERFORMANCE MEASUREMENT SYSTEM FOR EXTREMELY HIGH FREQUENCY WIRELESS AND FREE SPACE OPTICAL COMMUNICATION SYSTEMS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to a system that correlates weather and communication performance for communication systems such as extremely high-frequency wireless systems and free space optical systems.

2. Description of the Prior Art

In the telecommunications industry, the "last mile" to the customer still forms a bottleneck that undermines the full exploitation of technologies such as the Internet. Although de-regulation was supposed to usher in new competition, large telephone and cable TV companies still control the majority of the twisted pair and coaxial cable connections to end-users. Alternative access to these end-users is needed. This alternative access should have high availability and high bandwidth.

Extremely high frequency wireless communication systems and free-space optical communication systems could provide the needed alternative access to these end-users. Extremely high frequency wireless communication systems transfer wireless signals over the air at frequencies above 10 gigahertz—ten billion cycles per second. Some examples of extremely high frequency wireless communication systems include multi-channel multipoint distribution systems, local multipoint distribution systems, V-band systems, and W-band systems. Free-space optical communication systems transfer wireless signals over the air at frequencies above 10 terrahertz—ten trillion cycles per second. Some examples of free-space optical communication systems include laser systems and infrared systems. Advantageously, extremely high frequency wireless communication systems and free-space optical communication systems can exhibit both high availability and high bandwidth—especially when used together in a hybrid system.

Unfortunately, the weather adversely affects both extremely high frequency wireless communication systems and free-space optical communication systems. Existing test systems do not obtain adequate data to properly assess comparative system performance under various weather conditions. New systems are needed to provide detailed data regarding the performance of these systems in various weather conditions.

SUMMARY OF THE INVENTION

The invention helps solve the above problems with technology to assess the communication performance of extremely high frequency wireless communication systems and free-space optical communication systems under various weather conditions. Advantageously, the technology will help develop robust communication systems that optimize their performance during various weather conditions. These robust communication systems could help solve the last mile bottleneck that exists today. Examples of the invention include correlated weather and communication performance measurement systems, their methods of operation, and associated software products.

Some examples of the invention include a correlated weather and communication performance measurement system that includes a processing system and a communication interface. The communication interface is coupled to the processing system and is configured to receive performance data and weather data. The performance data indicates communication performance for a plurality of communication systems. The weather data indicates weather conditions for a geographic area including the communication systems. The processing system is configured to process the performance data and the weather data to generate correlated data that correlates in time the communication performance and the weather conditions for each of the communication systems. The communication systems comprise at least one of extremely high-frequency wireless systems and free space optical systems.

In some examples of the invention, the correlated weather and communication performance measurement system further comprises a performance measurement system configured to measure the communication performance of the communication systems and transfer the performance data to the communication interface. Communication performance might include at least one of: received signal power, data rate, bit errors, and availability. The performance measurement system may be configured to run a same communication performance test on each of the communication systems at a same time. At least a portion of the communication systems may comprise pairs of the communication systems having different ranges between the pairs.

In some examples of the invention, the correlated weather and communication performance measurement system further comprises a weather measurement system configured to measure the weather conditions for the geographic area including the communication system and transfer the weather data to the communication interface. The weather conditions might include at least one of: fog, precipitation rate, particulate size, visibility, wind speed, wind direction, temperature, and humidity.

In some examples of the invention, the correlated weather and communication performance measurement system further comprises a service validation system configured to process the correlated data to compare the communication performance to a service level applicable to the weather conditions correlated to the communication performance.

In some examples of the invention, the correlated weather and communication performance measurement system further comprises a stress introduction system configured to create artificial communication stress conditions for the communication systems.

Some examples of the invention, include a software product for a correlated weather and communication performance measurement system. The software product comprises control software and a storage system that stores the control software. The control software is configured to direct a processing system to receive performance data that indicates communication performance for a plurality of communication systems. The communication systems comprise at least one of extremely high-frequency wireless systems and free space optical systems. The control software is configured to direct the processing system to receive weather data that indicates weather conditions for a geographic area including the communication systems. The control software is configured to direct the processing system to process the performance data and the weather data to generate correlated data that correlates in time the communication performance and the weather conditions for each of the communication systems.

In some examples of the invention, the control software is configured to direct the processing system to process the correlated data to compare the communication performance to a service level applicable to the weather conditions correlated to the communication performance. In some examples of the invention, the control software is configured to direct the processing system to measure the communication performance of the communication systems.

DETAILED DESCRIPTION OF THE PREFERRED EMBODIMENT

Figure 1:
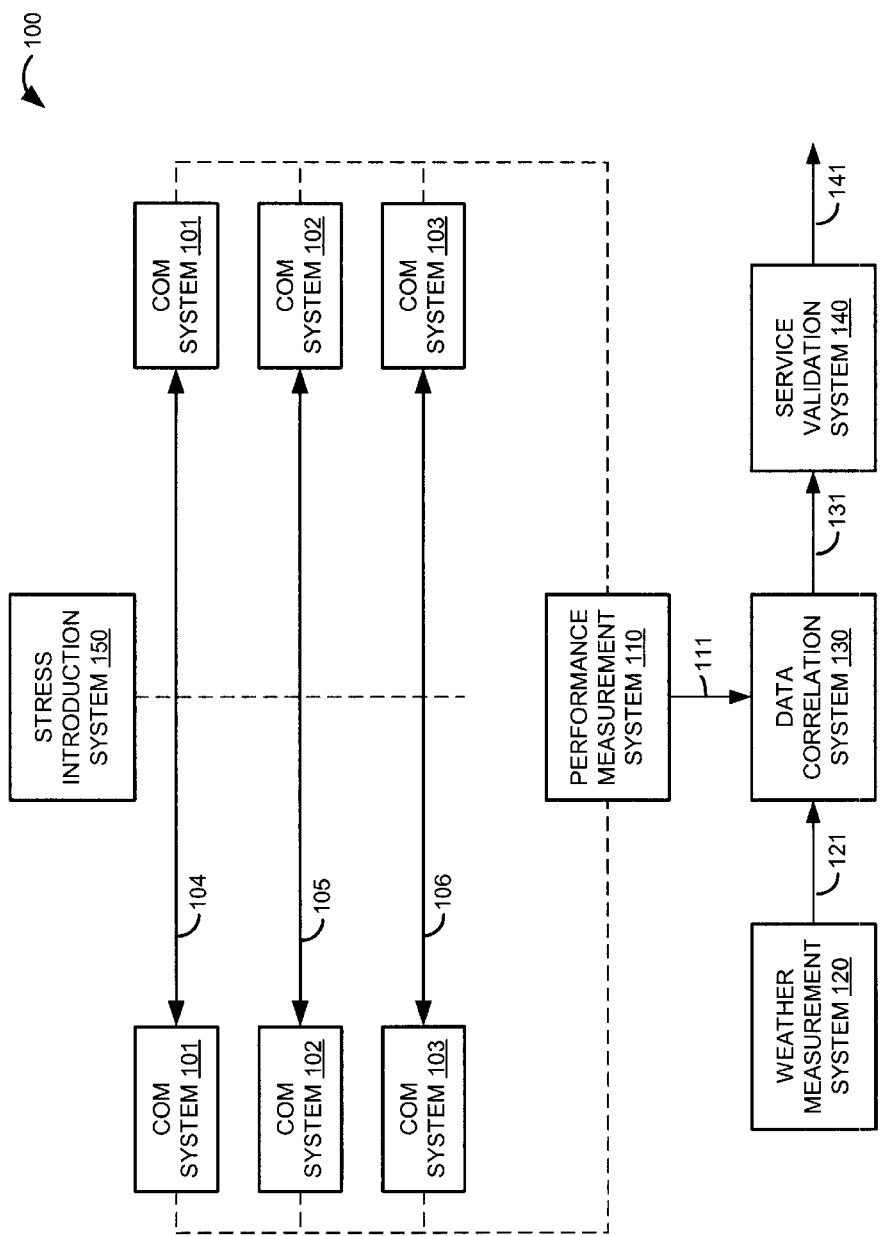
FIG. 1 illustrates a weather and communication performance measurement system in an example of the invention.
Figure 2:
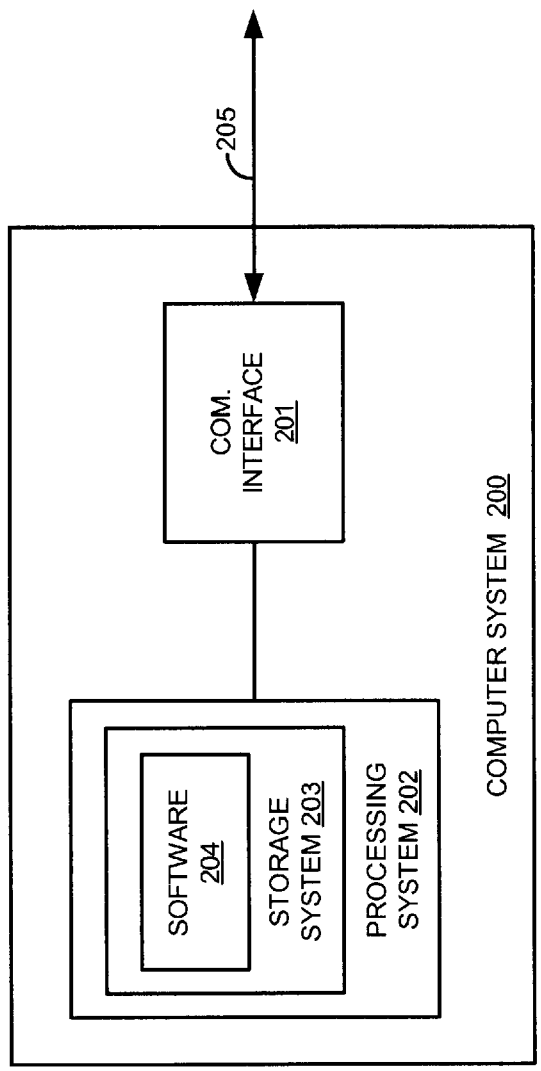
FIG. 2 illustrates a computer system in an example of the invention.

FIGS. 1–2 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates weather and communication performance measurement system 100 in an example of the invention. System 100 includes communication systems 101–103, performance measurement system 110, weather measurement system 120, data correlation system 130, service validation system 140, and stress introduction system 150. Communication systems 101–103 communicate over respective links 104–106. Based on this disclosure, those skilled in the art will appreciate how to modify and/or combine existing communications, weather, and computer equipment to make and use system 100.

Communication systems 101–103 could be extremely high-frequency wireless communication systems and/or free space optical communication systems, and thus links 104–106 would be extremely high-frequency wireless communication links and/or free space optical communication links. In the context of the invention, extremely high frequency wireless communication systems transfer wireless signals over the air at frequencies above 10 gigahertz—ten billion cycles per second. Some examples of extremely high frequency wireless communication systems include multi-channel multipoint distribution systems, local multipoint distribution systems, V-band systems, and W-band systems. In the context of the invention, free-space optical communication systems transfer wireless signals over the air at frequencies above 10 terrahertz—ten trillion cycles per second. Some examples of free-space optical communication systems include laser systems and infrared systems. Advantageously, extremely high frequency wireless communication systems and free-space optical communication systems could be implemented to solve the last-mile bottleneck by providing alternative access to end-users over the air.

Performance measurement system 110 measures the communication performance of communication systems 101–103. Communication performance includes received signal power, data rate, bit errors, link availability, packet loss, packet latency, bit error seconds, severe bit error seconds, framing errors, or some other effective communication performance measures. One example of a severe bit error second is a one second time period that has a bit error rate of $10^{-3}$. Performance measurement system 110 transfers performance data 111 to data correlation system 130. Performance data 111 indicates the individual communication performance for each of communication systems 101–103. In some examples, performance measurement system 110 runs the same communication performance test on the communication systems 101–103 at the same time. For example, performance measurement system 110 could separately run the same bit error test at the same time on system 101 over link 104, system 102 over link 105, and system 103 over link 106. Performance measurement system 110 could be physically separate from but coupled to communication systems 101–103 or system 110 could be partially or totally integrated within communication systems 101–103.

Weather measurement system 120 measures the weather conditions for the geographic area including communication systems 101–103. Weather measurement system 120 transfers weather data 121 to data correlation system 130. Weather conditions include fog, precipitation rate, particulate size, visibility, wind speed, wind direction, temperature, humidity, solar conditions, sunset/sunrise conditions, and other effective atmospheric measurements.

Data correlation system 130 receives and processes performance data 110 and weather data 121 to generate and transfer correlated data 131 that correlates in time the communication performance and the weather conditions for each of communication systems 101–103. In some examples, performance data 111 and weather data 121 are both time stamped, and data correlation system 130 correlates actual communication performance to actual weather conditions based on the time stamps. Other techniques could be used to correlate in time the actual communication performance and the actual weather conditions.

Service validation system 140 receives and processes correlated data 131 to compare the communication performance to a service level applicable to the weather conditions that are correlated to the communication performance. Service validation system 140 could then transfer validation data 141 indicating if service levels are met. Service validation system 140 would determine the service level that applies based on the actual weather conditions, and then compare the actual communication performance during the actual weather conditions to the predetermined service level for those weather conditions.

For example, different service levels could be specified having different minimum data rates and maximum bit error rates. These different service levels could then be associated with different ranges and combinations of weather conditions—such as precipitation rate, particulate size, temperature, and humidity. Service validation system 140 would identify the service level that is applicable to the actual weather conditions. Service validation system 140 would then compare the applicable service level to the actual communication performance—the actual minimum data rate and maximum bit error rate—that was correlated in time with the actual weather conditions. Thus, service levels for various weather conditions could be specified and validated based on actual communication performance and actual weather conditions. Service validation system 140 could be omitted in some examples of the invention.

Stress introduction system 150 creates artificial communication stress conditions for communication systems 101–103. For example, stress introduction system 150 could comprise a clouded lens that free-space laser signal must pass through. In another example, stress introduction system 150 could generate RF interference signals across links 104–106. To provide fair comparisons, stress introduction system 150 would typically introduce the same stress to each of communication systems 101–103 at the same time. Stress introduction system 150 could be omitted in some examples of the invention.

There are various implementations of system 100 that fall within the scope of the invention. There could be one communication system or numerous communication systems. The communication systems could use different technologies and/or be from different suppliers to assess comparative performance during various weather conditions. A group of communication systems from the same supplier could use communication links of different ranges to identify range limitations during various weather conditions. Groups of communication systems could be geographically separated to test communication performance under different weather conditions that are prevalent in different geographic areas. For example, groups of communication systems could be located at test sites in a snow prone area, fog prone area, heat prone area, and rain prone area.

System 100 could be designed to test various communication systems during various weather conditions to find optimum technologies and equipment for each of the weather conditions. In some cases, a hybrid system can be developed that combines these optimum systems, and that subsequently uses the optimum system based on the actual weather conditions in the field.

Instead of development testing, system 100 could be implemented to perform service validation for commercially deployed communication systems.

FIG. 2 illustrates computer system 200 in an example of the invention. Computer system 200 could implement performance measurement system 110, data correlation system 130, and/or service validation system 140, and thus, systems 110, 130, and 140 could be integrated together or have separate systems. In addition, computer system 200 could be used to control weather measurement system 120 and/or stress introduction system 150. Computer system 200 includes communication interface 201 and processing system 202. Processing system 202 is linked to communication interface 201 and includes storage system 203. Storage system 203 stores control software 204.

Computer system 200 could be comprised of a programmed general purpose computer, although those skilled in the art will appreciate that programmable or special purpose circuitry and equipment may be used. Computer system 200 may use a client server architecture where operations are distributed among a server system and client devices that together comprises elements 201–204.

Communication interface 101 exchanges data 205 between processing system 202 and external systems. Data 205 that is received includes performance data and weather data. Data 205 that is transferred includes correlation data and/or validation data. Communication interface 201 could comprise a network interface card or some other communication device. Communication interface 201 may be distributed among multiple communication devices.

Processing system 202 could comprise a computer microprocessor, logic circuit, or some other processing device. Processing system 202 may be distributed among multiple processing devices. Storage system 203 could comprise a disk, tape, integrated circuit, server, or some other memory device. Storage system 203 may be distributed among multiple memory devices.

Processing system 202 retrieves and executes control software 204 from storage system 203. Control software 204 could comprise an application program, firmware, or some other form of machine-readable processing instructions. When executed by processing system 202, control software 204 directs processing system 202 to operate in accord with this disclosure. In particular, processing system 202 processes performance data that indicates communication performance for a plurality of communication systems and weather data that indicates weather conditions for a geographic area or areas including the communication systems to generate correlated data that correlates in time the communication performance and the weather conditions for each of the communication systems. Processing system 202 may also process the correlated data to compare the communication performance to a service level applicable to the weather conditions correlated to the communication performance.

The following table illustrates correlation and validation data in an example of the invention. Note that the actual table entries are left blank and would be determined based on actual measurements and field conditions. The date/time, weather data, performance data, and validation determination are listed in the left column and the communication systems are listed across the top row.

| | DATE/TIME: | | | |
|---|---|---|---|---|
| | COM. SYS. A | COM. SYS. B | COM. SYS. C | COM. SYS. D |
| LOCATION | | | | |
| VISIBILITY | | | | |
| PRECIPITATION RATE | | | | |
| PARTICULATE SIZE | | | | |
| WIND SPEED | | | | |
| WIND DIRECTION | | | | |
| TEMPERATURE | | | | |
| HUMIDITY | | | | |
| BIT ERROR RATE | | | | |
| ERROR SECONDS | | | | |
| SEVERE ERROR SECONDS | | | | |
| % AVAILABLE | | | | |
| SERVICE LEVEL VALID | | | | |

What is claimed is:

1. A correlated weather and communication performance measurement system comprising:

a processing system configured to process performance data that indicates communication performance for a plurality of communication systems and weather data that indicates weather conditions for a geographic area including the communication systems to generate correlated data that correlates in time the communication performance and the weather conditions for each of the communication systems, wherein the communication systems comprise at least one of extremely high-frequency wireless systems and free space optical systems;

a communication interface coupled to the processing system and configured to receive the performance data and the weather data; and a stress introduction system configured to create artificial communication stress conditions for the communication systems.

2. The system of claim 1 wherein the performance measurement system is configured to measure the communication performance of the communication systems.

3. The system of claim 2 wherein the performance measurement system is configured to run a same communication performance test on each of the communication systems at a same time.

4. The system of claim 1 further comprising a weather measurement system configured to measure the weather conditions for the geographic area including the communication system and transfer the weather data to the communication interface.

5. The system of claim 1 further comprising a service validation system configured to process the correlated data to compare the communication performance to a service level applicable to the weather conditions correlated to the communication performance.

6. The system of claim 1 wherein the communication performance comprises at least one of: received signal power, data rate, bit errors, and availability.

7. The system of claim 1 wherein the weather conditions comprise at least one of: fog, precipitation rate, particulate size, visibility, wind speed, wind direction, temperature, and humidity.

8. The system of claim 1 wherein at least a portion of the communication systems comprise pairs of the communication systems having different ranges between the pairs.

9. A method of operating a correlated weather and communication performance measurement system, the method comprising:

receiving performance data that indicates communication performance for a plurality of communication systems, wherein the communication systems comprise at least one of extremely high-frequency wireless systems and free space optical systems;

receiving weather data that indicates weather conditions for a geographic area including the communication systems;

processing the performance data and the weather data to generate correlated data that correlates in time the communication performance and the weather conditions for each of the communication systems; and creating artificial communication stress conditions for the communication systems.

10. The method of claim 9 further comprising measuring the communication performance of the communication systems.

11. The method of claim 10 wherein measuring the communication performance of the communication systems comprises running a same communication performance test on each of the communication systems at a same time.

12. The method of claim 9 further comprising measuring the weather conditions for the geographic area including the communication system.

13. The method of claim 9 further comprising processing the correlated data to compare the communication performance to a service level applicable to the weather conditions correlated to the communication performance.

14. The method of claim 9 wherein the communication performance comprises at least one of: received signal power, data rate, bit errors, and availability.

15. The method of claim 9 wherein the weather conditions comprise at least one of: fog, precipitation rate, particulate size, visibility, wind speed, wind direction, temperature, and humidity.

* * * * *